(12) United States Patent
Bowie (10) Patent No.: US 12,466,519 B2
(45) Date of Patent: Nov. 11, 2025

(54) DISCONNECTABLE MOORING SYSTEM

(71) Applicant: SLLP 134 Limited, Aberdeen (GB)

(72) Inventor: Malcolm Bowie, Aberdeen (GB)

(73) Assignee: ENCOMARA LIMITED, Aberdeen (GB)

( * ) Notice: Subject to any disclaimer, the term of this patent is extended or adjusted under 35 U.S.C. 154(b) by 443 days.

(21) Appl. No.: 17/926,895

(22) PCT Filed: May 21, 2021

(86) PCT No.: PCT/EP2021/063656
§ 371 (c)(1),
(2) Date: Nov. 21, 2022

(87) PCT Pub. No.: WO2021/234148
PCT Pub. Date: Nov. 25, 2021

(65) Prior Publication Data
US 2023/0094823 A1    Mar. 30, 2023

(30) Foreign Application Priority Data

May 22, 2020  (GB) .................................... 2007691
Sep. 11, 2020  (GB) .................................... 2014361

(51) Int. Cl.
*B63B 21/50*   (2006.01)
*B63B 21/00*   (2006.01)
(Continued)

(52) U.S. Cl.
CPC .............. *B63B 21/50* (2013.01); *B63B 21/20* (2013.01); *B63B 21/26* (2013.01); *B63B 22/021* (2013.01);
(Continued)

(58) Field of Classification Search
CPC ......... B63B 21/50; B63B 21/20; B63B 21/26; B63B 22/021; B63B 2021/004;
(Continued)

(56) References Cited

U.S. PATENT DOCUMENTS 9,003,994 B2 *   4/2015   Leverette ................ B63B 21/18
                                                            114/200
9,381,977 B2 *   7/2016   Leverette ................ B63B 21/50
(Continued)

FOREIGN PATENT DOCUMENTS

JP          2016-84630       5/2016
JP          6396427 B2       9/2018
(Continued)

OTHER PUBLICATIONS

Search Report, GB2007691.5, Mailed Oct. 22, 2020.
(Continued)

*Primary Examiner* — Anthony D Wiest
(74) *Attorney, Agent, or Firm* — Thomas | Horstemeyer, LLP (57) ABSTRACT

A disconnectable mooring system for offshore semi-submersible floating structures. A disconnectable buoy has a number of mooring lines which include a buoy chain between the mooring chain and the buoy. The mooring chain and the buoy chain are connected via a three way mooring connector, with the third connection configured to pull the mooring connector to a mooring point on the structure. In a first configuration the buoy is disconnected and supports the mooring chains for recovery at shallow depths to be pulled in. In a second configuration, the mooring lines are pulled in via the mooring connectors thereby providing a spread mooring to the structure with the buoy chain left as a catenary between the buoy and mooring point.

20 Claims, 11 Drawing Sheets

(51) Int. Cl.
*B63B 21/20* (2006.01)
*B63B 21/26* (2006.01)
*B63B 22/02* (2006.01)

(52) U.S. Cl.
CPC ... *B63B 2021/004* (2013.01); *B63B 2022/028* (2013.01)

(58) Field of Classification Search
CPC ........ B63B 2022/028; B63B 2035/446; B63B 21/508; B63B 2021/505; Y02E 10/72; Y02E 10/727; F03D 13/25; F03D 80/00; F05B 2240/932; F05B 2240/95; F05B 2240/97

See application file for complete search history.

(56) References Cited

U.S. PATENT DOCUMENTS

| | | |
|---|---|---|
| 10,041,469 B2 | 8/2018 | Hashimoto |
| 2007/0264889 A1 | 11/2007 | Boatman et al. |
| 2009/0158987 A1 | 6/2009 | Ramachandran et al. |
| 2015/0252791 A1 | 9/2015 | Taub |
| 2017/0349243 A1 | 12/2017 | Lisland |

FOREIGN PATENT DOCUMENTS

| | | |
|---|---|---|
| WO | 96/17766 | 6/1996 |
| WO | 2016/069636 A2 | 5/2016 |
| WO | 2019/143282 A1 | 7/2019 |

OTHER PUBLICATIONS

Combined Search and Examination Report, GB2007691.5, Mailed Oct. 23, 2020.

International Search Report and Written Opinion, PCT/EP2021/063656, mailed Jan. 25, 2022.

\* cited by examiner

Figure 1a
(Prior Art)

Detail 1c
(Prior Art)

Detail 3c

Figure 5a (above)

Figure 5c (underside)

Detail 7b

Detail 7c

Detail 7d

DISCONNECTABLE MOORING SYSTEM

The present invention relates to mooring systems for offshore semi-submersible floating structures and in particular, though not exclusively, to a disconnectable mooring system for floating offshore wind turbines.

Wind power is a recognised and heavily used renewable energy source. Offshore locations are now being sought for wind turbines as higher wind energy yields can be obtained and there are less spatial restrictions compared to those located onshore. The first offshore wind turbines were formed on a monopile foundation buried in the seabed. The use of jackets, these being a foundation built like a grid construction of steel resting on typically four piles, were developed as they are more robust in relation to the size of foundation at greater depths and specific types of subsurface. To access the deeper water and reduce construction costs compared to jackets, floating offshore wind turbines (FOWT's) are now in use.

It is anticipated that FOWT's will have to be disconnected at a number of points in their service life. This is particularly due to the increasing size and height of the turbines making motion at the nacelle level greater, complicating major repair offshore. This is made more onerous by the water often being too deep for jack-up crane vessels, which are fixed to the seabed, and hence floating crane vessels have to be used. The motion at the crane tip of floating cranes is significantly greater than a jackup crane vessel. When turbines are attached to a jacket such motions are significantly less or negligible due to the jacket being anchored and fixed to the seabed.

Figure 1A:
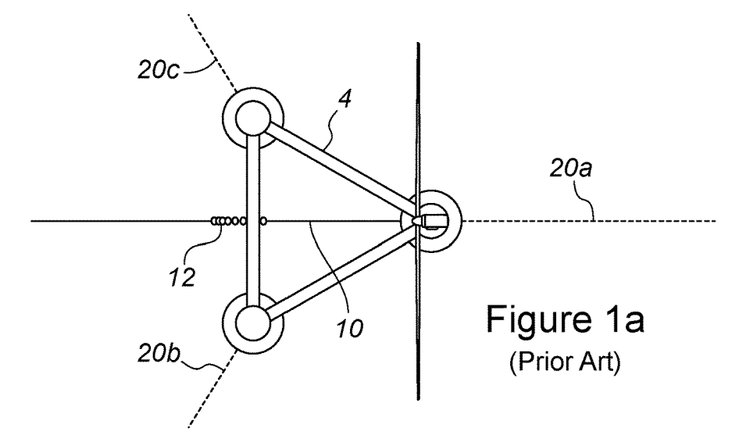
Figure 1B:
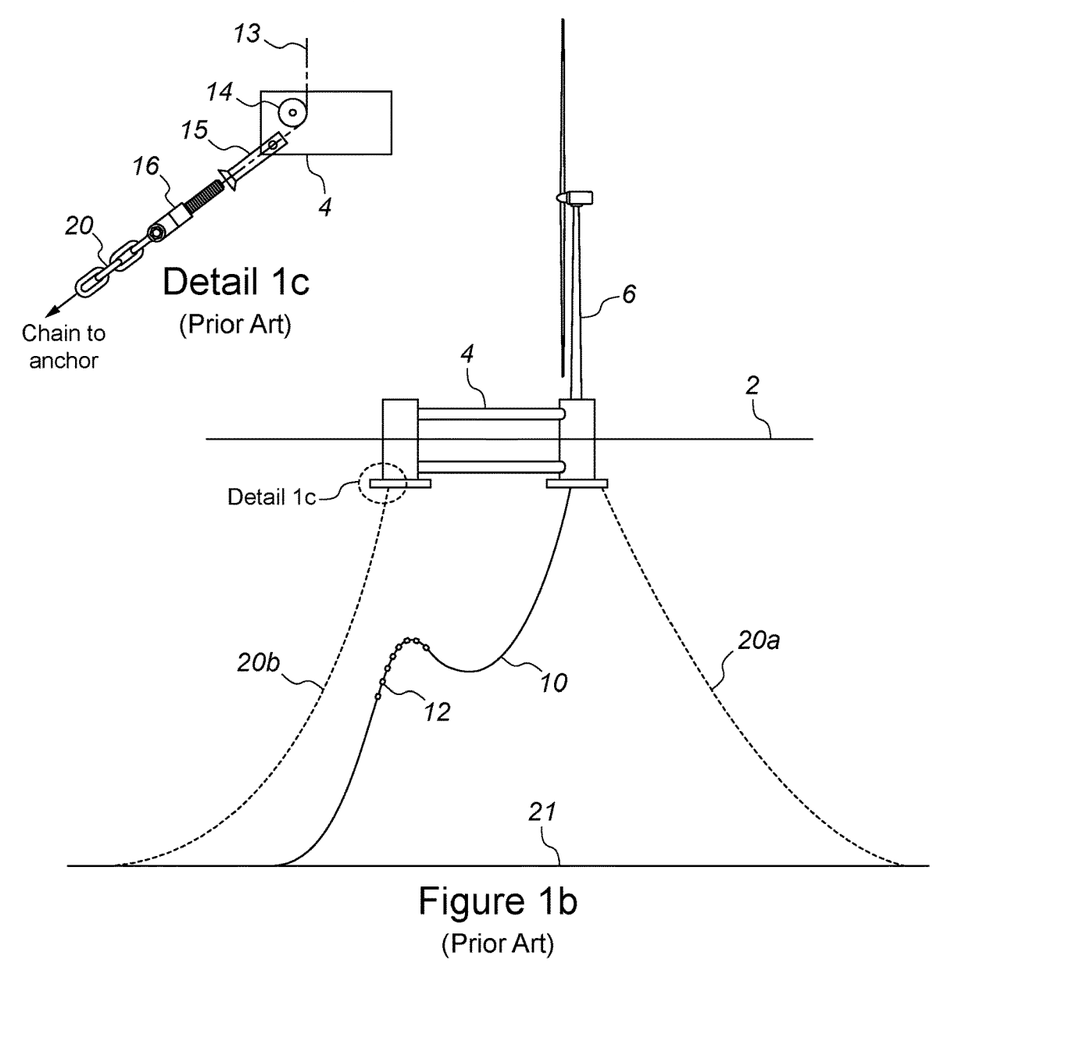

FIGS. 1a to 1c show the prior art of a typical arrangement of a multi-column semi-submersible FOWT on its spread moorings. FIG. 1a shows the semi-submersible 4, connected to the mooring lines 20a which connect to anchors on the seabed. Such spread moorings have each mooring line individually connected to each corner of the facility which remains on a fixed heading. Only three mooring lines are illustrated for clarity; however, typically up to six-nine mooring lines may be required for the design. The dynamic power cable riser 10 is illustrated in a lazy-wave profile with buoyancies 12. FIG. 1b shows the arrangement in elevation.

Detail 1c is a typical arrangement for pull-in of a mooring line using a winch 13 from the top of the column, diverted around a sheave 14 and through a female connecting arrangement 15 on the semi-submersible. The winch is connected to the end of the mooring connector 16 and when fully engaged the winch wire is disconnected.

There are a range of types of mooring connectors available as prior art; hence the design shown is for illustration only.

This arrangement is typical in not only semi-submersibles but a range of other moored floating structures and ships.

A disadvantage of these arrangements is that to disconnect and re-connect a FOWT offshore is a long and expensive operation since they typically have between three and nine mooring lines plus typically two dynamic power cables. The connection of the mooring lines and power cable system involves locating, surveying, lifting, and connecting the end of each line individually to the FOWT. During this time the FOWT will have to be held in position by towing vessels. The hook-up can be a long and difficult process, especially in deep water or if the area is congested with platforms, vessels or other floating structures and their moorings. The pull-in of the dynamic power cable is performed after the completion of the mooring hook-up and the cable hook-up itself can be of a long duration with attendant risks of damage.

Other floating vessels such as ships use turret mooring systems being a single point mooring (SPM) where the mooring lines come to a central point around which the ship rotates via a swivel. Turret mooring systems are normally used in harsher environments where the loads on the mooring system can be reduced by allowing the ship to vane or head into the weather. US2007/0264889 discloses a disconnectable submerged turret buoy providing a single point mooring (SPM) for a vessel. The buoy has the mooring connection points on a radius, significantly smaller than the width of the vessel and much smaller than the length of the vessel, and the buoy is pulled in and secured to the vessel. The turret is geostationary with the vessel weather vaning around it by virtue of a swivel in response to wind, waves and current.

WO2016069636 discloses a disconnectable buoy system for FOWT's. In this system, the power cables are supported by the buoy while the mooring lines are connected in the standard spread mooring arrangement, separate from the buoy and individually to each column. A disadvantage of this arrangement is that the power cable(s) have to hold the disconnectable buoy in position when it is disconnected, but not be damaged by the buoy movement. In addition, the buoy may become very large in deep water due to the weight of cables and present a restriction in the marine operations.

As each corner of a semi-submersible floating structure may be 50 m-150 m apart, it is not practical to use a submerged turret buoy of such large dimensions. Current disconnectable turret buoy designs would only be connected to a single point on the semi-submersible and hence the asymmetric structure is highly likely to rotate around this point, twisting the moorings and cable around each other, unless a swivel is incorporated, which adds significantly to the cost and complexity. If a swivel is incorporated, the semi-submersible would weather-vane interfering with the swivel located on the turbine nacelle to turn the blades to the optimal heading.

It is therefore an object of the present invention to provide a disconnectable mooring system for offshore semi-submersible floating structures which obviates or mitigates one or more disadvantages of the prior art.

According to a first aspect of the present invention there is provided a disconnectable mooring system for offshore semi-submersible floating structures, comprising:

a buoy including means to connect and disconnect from the structure;

a plurality of mooring lines;

each mooring line comprising a mooring chain, the mooring chain having a first end connected to an anchor on the seabed;

at least one mooring line also comprising a buoy chain, a first end of the buoy chain being connected to a second end of the mooring chain via a mooring connector and a second end of the buoy chain being connected to the buoy;

wherein, in use: in a first configuration, the buoy is disconnected from the structure and the buoy chain supports the mooring chain, preventing the mooring connector contacting the seabed; and in a second configuration, the buoy is connected to the structure and the mooring chain is pulled in via the mooring connector to a mooring point on the structure to tension the mooring chain, thereby providing a spread mooring to the structure with the buoy chain being in a catenary.

In this way, mooring chains can be arranged from mooring points around the structure in the same pattern as for a spread mooring, with the advantages that each is also attached to the disconnectable buoy and thus need only be pulled in from a shallow water depth. While the term chain is used, it will be understood that this can mean wire, cable or rope elements or any element which constitutes part of a standard mooring line.

Preferably, the means to connect and disconnect the disconnectable buoy from the structure is swivel-less. In this way, the mooring system prevents the structure from weather vaning and is cheaper than other turret buoy systems.

Preferably, in the second configuration mooring tension on the buoy is applied from no more than one side of the buoy. Where a buoy chain is present, no tension is applied to the buoy from that mooring line, as the tension is applied to the mooring point instead. In an embodiment, all of the mooring lines include a buoy chain. In this way, there is no mooring tension applied to the buoy.

There may be at least one mooring line in which the second end of the mooring is connected directly to the buoy, this mooring line providing mooring tension to the buoy. Preferably, there is only one such mooring line on the buoy. Alternatively, there may be a plurality of such mooring lines, but they are all connected to the buoy on only one side. In this way, mooring tension is applied to the buoy from a first direction. A plurality of such mooring lines may be located on a side of the buoy and provide mooring tension over an arc of less than 180 degrees. More preferably the arc is less than or equal to 130 degrees. The arc may be less than or equal to 90 degrees. The arc may be less than or equal to 45 degrees. Preferably there are two mooring lines which consist only of mooring chain. The environmental force acts on the buoy via the moorings on one side of the buoy only.

Preferably, the mooring connector is a three-way connector, providing a first connection to the mooring chain, a second connection to the buoy chain and a third connection for joining to a mooring point on the structure.

In an embodiment, the third connection provides a mating connector for connection to a winch or other like pulling in arrangement. In this way, the third connection is as for the prior art arrangements to connect and pull-in mooring lines in the second configuration. The mooring chain and connector for the third connection may be in-line with the second connection being perpendicular to the first and third connections. Alternatively, each connection provides a pivot so the mating connector will take up the position dependent of the tension applied at each connection. In this way, the mooring line can be pulled in by known arrangements.

The at least one mooring line also comprising a buoy chain may further comprise a second mooring chain, the second mooring chain having a first end connected to an anchor on the seabed and a second end connected to the mooring connector. Additionally, the at least one mooring line also comprising a buoy chain, may further comprise a third mooring chain, the third mooring chain having a first end connected to an anchor on the seabed and a second end connected to the mooring connector. In this way, a single buoy chain and mooring connector can be used to pull in multiple mooring chains to a mooring point. It will be appreciated that the mooring connector would be a four or five way connector, respectively.

More than one mooring chain may be connected to a single anchor on the seabed. In this way, mooring lines from a single anchor can be located at different mooring points on the structure.

The buoy may be fully submerged in both the first and the second configurations, in use. The buoy may be connected to an underside of the structure. The underside may be a keel. In this way, the buoy can be considered as a plug located under the structure and connected to any column base or centre point of the structure. The buoy will have dimensions much smaller than those of the structure. Alternatively, the buoy may be partially submerged in both the first and the second configurations, in use. The buoy may be clamped onto a side of the structure. The buoy may be clamped onto a column of a structure. Single column, spar floating structures are particularly suited to the buoy being clamped to the side. In this way, the buoy always pierces the water surface, when disconnected so that it can be easily identified when the structure is floated out for mooring. The position of the buoy in the water may be controlled by the length of the mooring lines calculated for weight and sea depth, or by ballasting of the buoy.

Preferably, the buoy chains are more lightweight than the mooring chains. A lighter gauge chain can be selected for the buoy chains as they carry no tension when the structure is moored.

Preferably, the buoy also includes connection for cables. The cables may be used for transporting power or communication signals. The buoy may also include connections for risers. Flexible risers may be used for transporting fluids or gases. In this way, power cables and/or risers can be hooked-up internally to the internals or topside facilities on the structure. More preferably, a manifold is provided on the buoy. In this way, continuity between two or more risers can be achieved when the buoy is disconnected. This is particularly advantageous for floating offshore wind applications, where otherwise there is a break in the electrical circuit when cable ends are laid down on the seabed a distance apart.

Preferably the floating semi-submersible structure is a multi-column floating semi-submersible structure. In this way, mooring points may be located on each column, though one column may instead have the buoy connected thereto. However, any floating structure which has large dimensions to cause weather vaning could be considered, such as vessels, boats, barges or spars. Preferably also the floating semi-submersible structure supports a wind turbine.

There may be a plurality of buoys attached to the floating semi-submersible structure, there being a buoy chain connecting the buoys together. In this way, a buoy can be arranged at any location were cables/dynamic risers are required across the structure, with the buoys maintaining relative positions when in the first configuration.

According to a second aspect of the present invention there is provided a method of mooring an offshore semi-submersible floating structure, comprising the steps:
 (a) providing a disconnectable mooring system according to the first aspect;
 (b) connecting the buoy to the structure;
 (c) pulling in a mooring connector to a mooring point on the structure to tension the mooring chain on each of the mooring lines also comprising a buoy chain;
 (d) and thereby spreading the mooring lines around the structure.

The method may include fully submerging or partially submerging the buoy. At step (b) the buoy may be connected to an underside of the structure or be clamped to a side of the structure.

The method may include the further step of disconnecting the disconnectable mooring system from the offshore semi-submersible floating structure. The step of disconnecting may comprise releasing the disconnectable mooring system in a controlled manner by lowering the mooring lines and buoy using winches or other methods as known in prior art. Alternatively, the step of disconnecting may comprise releasing the disconnectable mooring system by an emergency release method where the mooring connectors and buoy fall under gravity to an equilibrium depth. This has the significant advantage that the mooring system can be rapidly disconnected, but yet the moorings, buoy and cables are left in a safe configuration ready for efficient re-connection.

In the description that follows, the drawings are not necessarily to scale. Certain features of the invention may be shown exaggerated in scale or in somewhat schematic form, and some details of conventional elements may not be shown in the interest of clarity and conciseness. It is to be fully recognized that the different teachings and features of the embodiments discussed below may be employed separately or in any suitable combination to produce the desired results.

Accordingly, the drawings and descriptions are to be regarded as illustrative in nature, and not as restrictive. Furthermore, the terminology and phraseology used herein is solely used for descriptive purposes and should not be construed as limiting in scope.

There will now be described, by way of example only, various embodiments of the invention with reference to the drawings, of which:

FIGS. 1a,1b and 1c are illustrations of a mooring system for offshore semi-submersible floating structures according to the prior art;

FIGS. 2a,2b and 2c are illustrations of a mooring system for offshore semi-submersible floating structures shown in a second configuration according to an embodiment of the present invention;

FIGS. 3a,3b and 3c are illustrations of the mooring system of FIGS. 2a,2b and 2c shown in a first configuration according to an embodiment of the present invention;

FIGS. 7a-e illustrate further embodiments of mooring systems according to embodiments of the present invention;

Figure 2A:
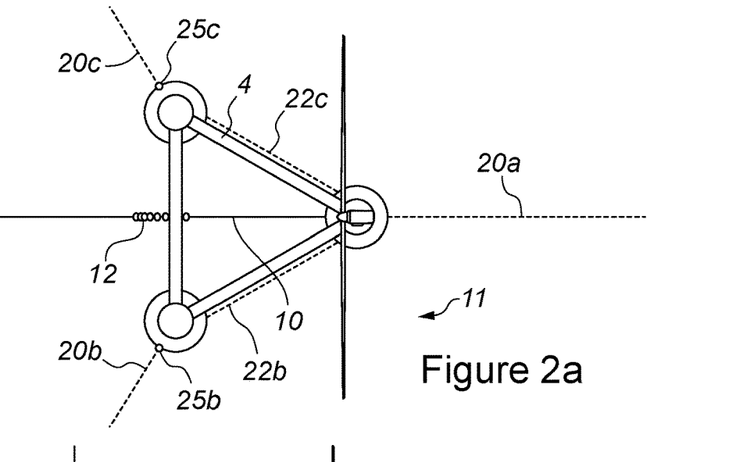
Figure 2B:
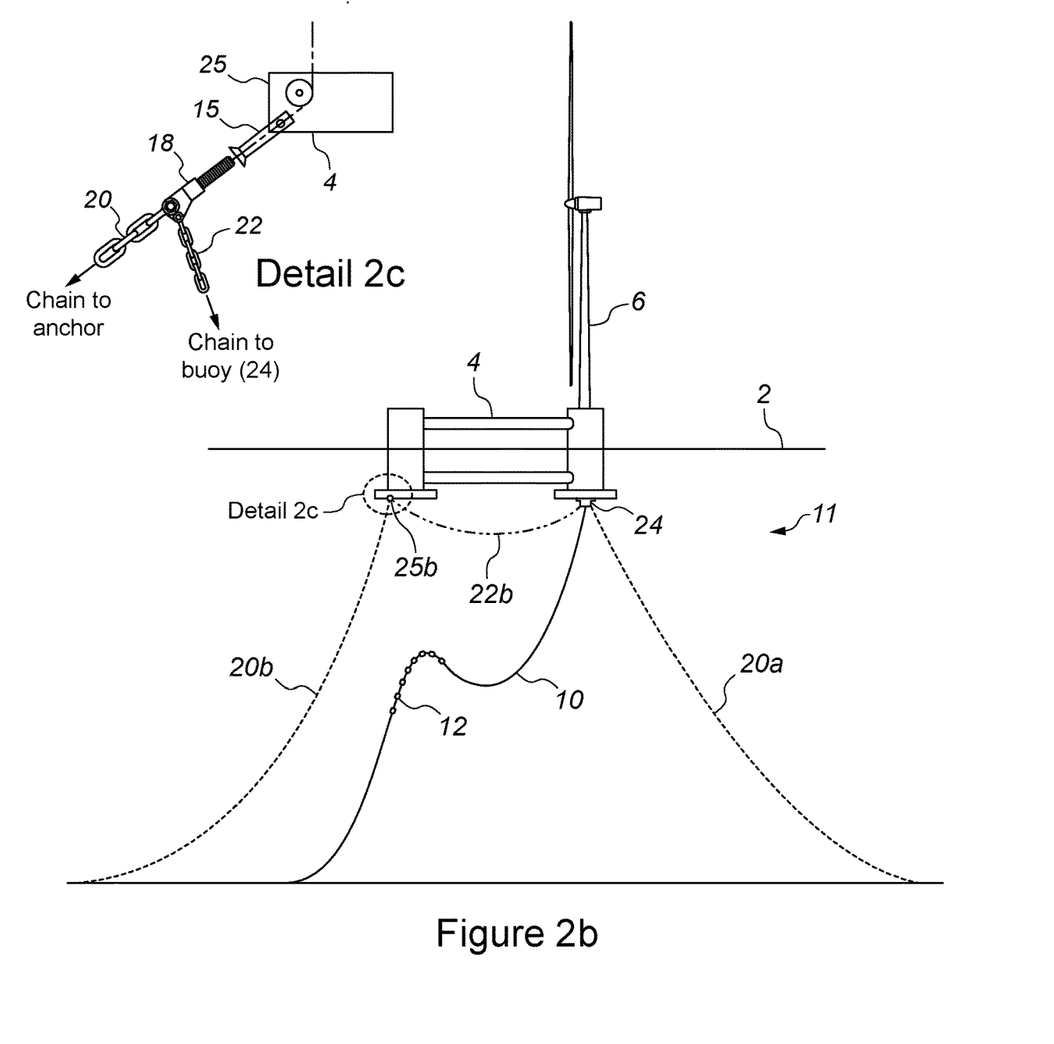

Reference is initially made to FIGS. 2a to 2c which illustrates a mooring system, generally indicated by reference numeral 11, connected to an offshore semi-submersible floating structure 4, the system 11 comprising a buoy 24 and mooring lines 20a-c, with buoy chains 22b,c according to an embodiment of the present invention.

In FIG. 2, the offshore semi-submersible floating structure 4 is a three-column semi-submersible which sits floating in the sea breaking the waterline 2. While a three-column semi-submersible is shown, the offshore semi-submersible floating structure could be any floating structure which supports a wind turbine 6. Multi-column semi-submersibles are typically selected as illustrated in the prior art, FIG. 1a-c. The buoy 24 is connected to the underside or keel of an outer column of the semi-submersible 4 and the mooring lines 20a-c are connected to the semi-submersible 4 via the buoy 24.

FIG. 2a shows a similar arrangement to the prior art of FIGS. 1a-c with the same size of turbine 6, semi-submersible 4 and mooring lines 20a to 20c. In the plan view there is little obvious difference apart from additional mooring lines or 'buoy lines', which we will refer to as buoy chains, 22b and 22c which are underneath the semi-submersible 4. Mooring line 20a is a mooring chain which at a first end is anchored to the seabed 21 and at a second end is connected to the buoy 24. Mooring line 20a is as known in the art and while referred to as a mooring chain it may be a chain, wire, rope or any other like line used for anchoring in mooring systems. Mooring lines 20b,c are also mooring chains which at a first end are also anchored to the seabed 21. At a second end they are connected to a mooring connector 18 which in turn is connected to a buoy chain 22b,c. Again, while referred to as a mooring or buoy chain these may be a chain, cable, wire, rope or any other like line used for anchoring in mooring systems. The other end of the buoy chain 22b,c is connected to the buoy 24. The mooring connector 18 is a three-way connector as, besides connecting to the mooring chain 20b,c and the buoy chain 22b,c also have a connection as for the prior art for pull-in of a mooring line using a winch 13 from the top of the column, diverted around a sheave 14 and through a female connecting arrangement 15 on the semi-submersible 4 at the mooring point 25b,c.

FIG. 2b shows an elevation of the same arrangement, in which the mooring line 20a is connected to the disconnectable buoy 24, which is connected into the keel of a semi-submersible in one column. The mooring lines 20b and 20c are connected onto the semi-submersible at mooring points 25b,c; however, the additional buoy lines 22b are shown running from the buoy to the connection point or mooring point 25b,c on the semi-submersible for the main mooring lines.

Detail 2c shows that the mooring connector 18 is a different design having a connection for the 'buoy line' or buoy chains 22b,c. The pull-in arrangement of winch, sheave and female connector is essentially unchanged with the connector 18 mating with a receptor at the mooring point on the structure. The mooring chain 20 will take the environmental loads on the semi-submersible through the connector arrangement 15/18 and the buoy chain 22b,c will hang in a slack catenary configuration to the buoy 24. In this figure the buoy chain is shown as smaller than the mooring chain since it does not take the large environmental loads in service.

The buoy 24 is easily connected/disconnected from the semi-submersible hull and supports the moorings 20 and power cables 10 deeper in the water; but avoids the requirement for swivels by controlling the heading of the semi-submersible 4. Further when the buoy is pulled into the keel of the structure, if the elevation of the top of the buoy is above the water level, or the internal compartment can be made water-tight the power cables can be connected to the structure's electrical system without any handling of the dynamic power cable, which is a significant safety improvement together with cost-reduction.

When connected to the structure 4, the buoy 24 transfers the mooring loads from a limited arc of directions, generally only from the mooring lines 20b,c that are connected within that arc. The buoy 24 therefore only experiences mooring tension from the one direction, that being the mooring line 20a directly connected to the seabed 21. The mooring loads on lines 20b,c are experienced directly by the structure 4 with the buoy chains 22b,c being redundant when the mooring chains 20b,c are pulled in via the mooring connector 18 to mooring points 25b,c on the structure 4. With the mooring chains 20b,c pulled in to tension the mooring lines 20a-c, the semi-submersible 4 is moored in the same spread mooring arrangement as for the prior art, FIGS. 1a-c.

The mooring 20b,c and buoy chain 22b,c will be a continuous line with a connection between each section which, itself connects into the semi-submersible 4 at the mooring point 25b,c.

Figure 3A:
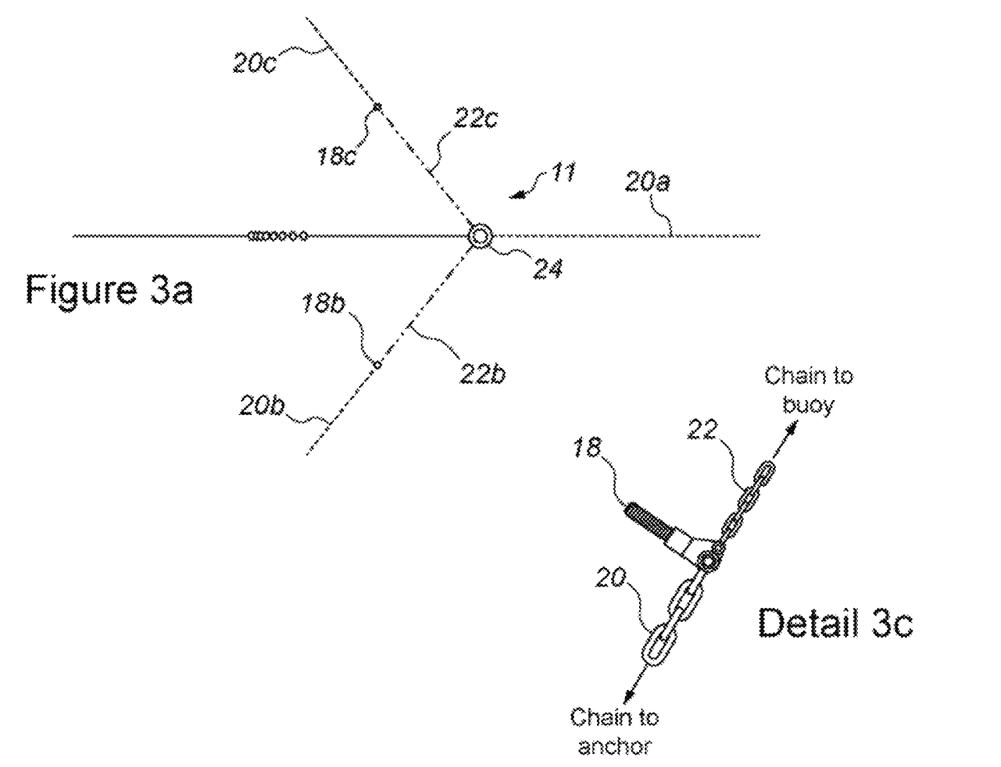
Figure 3B:
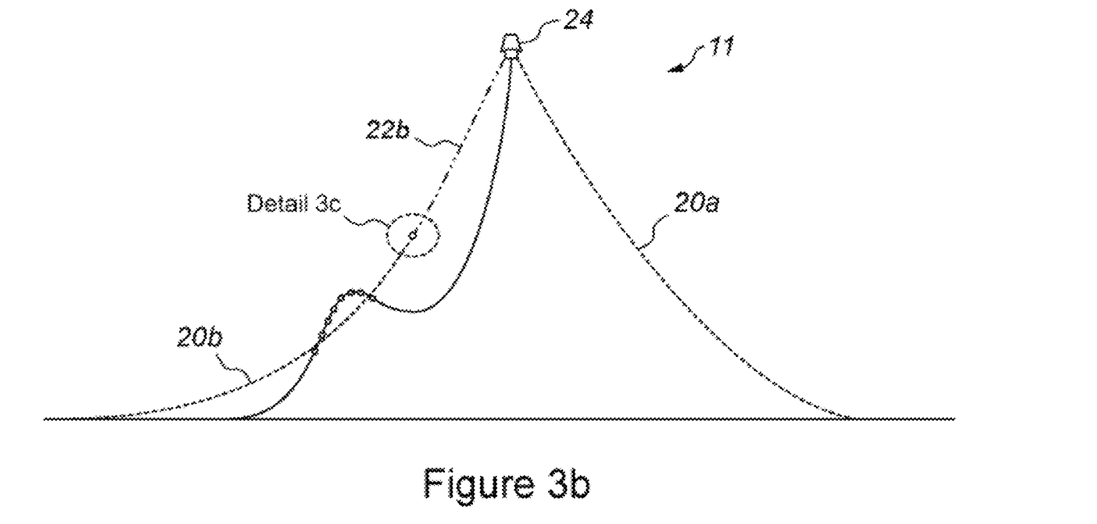

FIG. 3 illustrates the arrangement of the now disconnected buoy 24 in a submerged state prior to arrival or following departure of the semi-submersible 4. The disconnected buoy 24 may be considered as a first configuration of the mooring system 11 and the buoy 24 connected to the structure 4, as shown in FIGS. 2a-c, is considered as the second configuration.

FIG. 3a shows the arrangement in the disconnected state, first configuration, in a plan view with the buoy 24 and mooring lines 20a to 20c. The mooring lines 20b and 20c are connected to the buoy via 'buoy lines' i.e. the buoy chains 22b and 22c and mooring connectors 18b and 18c.

FIG. 3b shows the arrangement in elevation, showing the buoy 24 lowered deeper into the water to avoid the keel of passing ships. The mooring line 20b is in a similar catenary to the buoy line 22b and thus the arrangement is stable in the water, without having to lower any of the mooring lines or power cable(s) to the seabed 21.

Detail 3c shows the connector 18 in its disconnected state and rotated approximately 90 degrees from it's connected orientation, in the mooring catenary. By making the connection of the mooring chain 22b,c and the buoy chain 20b,c to the mooring connector 18 be a pivoted connection, so each can rotate relative to the other, the mooring connector 18 can rotate to change the angle between the connections. The buoy chain 22 is shown as smaller gauge since it only takes the weight of the mooring line 20 and the subsea environmental forces on the disconnectable buoy 24. By reducing the buoy chain size, this also reduces the buoyancy required of the disconnectable buoy 24, further reducing costs.

Thus the buoy 24 allows the support of all mooring lines 20a-c when disconnected by either being connected directly on the buoy 20a, or supported via a short 'buoy' chain 22b,c, which is redundant when the semi-submersible 4 is fully connected.

By introducing the extra length of 'buoy chain' into the mooring line catenaries when disconnected from the semi-submersible the buoyancy required to hold the mooring lines and power cable in the water is reduced due to a lower pre-tension.

Reference is now made to FIGS. 4a-f of the drawings which illustrates the typical procedure by which a buoy 24 is pulled into a semi-submersible 4 and each mooring line 20b,c is connected to the structure to achieve a permanently moored status. FIGS. 4a-f shows the method of connecting the buoy 24 and mooring lines 20a-c to the semi-submersible 4. For clarity the dynamic riser 10 is not shown and only two mooring lines are illustrated in the sketches; however, the same method will generally be used where there are more than two mooring lines, for example, 3, 6, 8, 9, 12, 15 or 16.

Figure 4A:
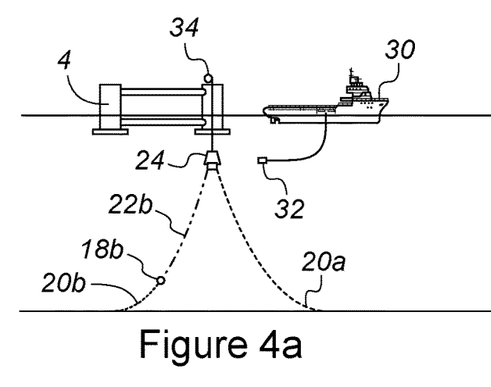
FIGS. 4a to 4f illustrate the steps in connecting the mooring system of FIGS. 2a-2c from the first configuration to the second configuration.

FIG. 4a shows the buoy 24, underneath the semi-submersible 4, which has a winch 34 on one of the columns with a winch-wire passing through the column and connected to the buoy 24 under the keel. The mooring line 20a is connected to a seabed anchor and the buoy. The mooring line 20b is connected to a seabed anchor and to the buoy chain 22b via the mooring connector 18b. The buoy chain 22b is connected to the buoy 24. To support the connection operation a support vessel 30 is positioned nearby with a Remote Operate Vehicle (ROV) 32 in support.

Figure 4B:
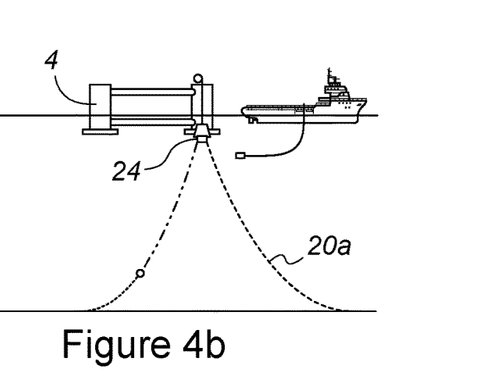

FIG. 4b shows the buoy 24 pulled into the semi-submersible 4. The mooring line 20a is now under a slightly higher tension and connected to the semi-submersible 4 via the buoy 24.

Figure 4C:
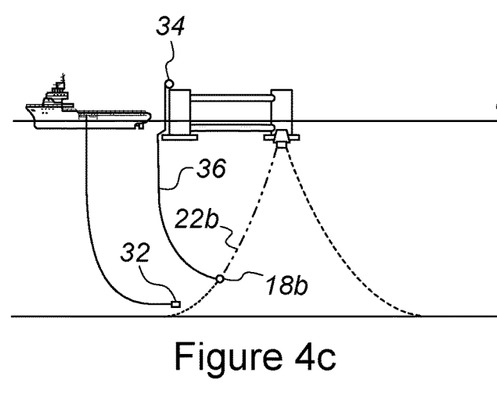

FIG. 4c shows the winch 34 relocated to allow pull-in of the moorings to the semi-submersible. A winch wire 36 has been lowered from the winch to the vicinity of the mooring connector 18b. The ROV 32 from the support vessel 30 is used to connect the winch wire to the mooring connector 18b to allow pull-in to the semi-submersible 4.

Figure 4D:
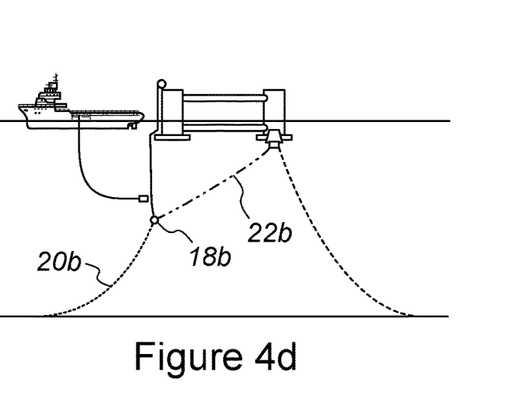

FIG. 4d shows the winch wire 36 connected to the mooring connector 18b and the pull-in to the semi-submersible 4 commenced. As the winch wire 36 is pulled in, the tension in the mooring line 20b increases and the tension in the buoy chain 22b decreases. At this time the angle of the mooring connector 18b is becoming more vertical. That is it moves from the position shown in FIG. 3c to the position shown in FIG. 2c.

Figure 4E:
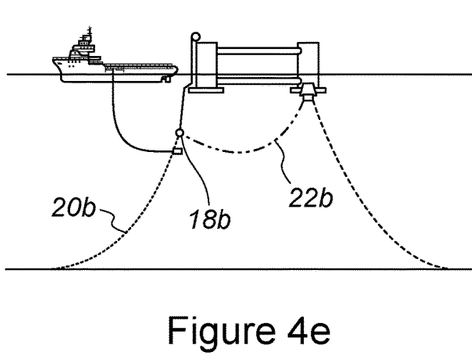

FIG. 4e shows the mooring connector 18b approaching its final position. At this point the tension is mostly on the mooring line 20b and pull-in winch wire 36 with the buoy chain 22b hanging slack. At this time the mooring connector 18a angle has past vertical and near to its final connected angle. One of the key features of this arrangement is that the angle of the mooring connector 18b can orientate relatively easily to the line of pull, making not only the connection subsea of the winch line easier, but also avoiding having to have anchor handling vessels thrusting with high force to assist the connection. This significantly reduced reliance on high tension and ship position and has significant advantages in the reducing risks and fuel consumed in the operation.

Figure 4F:
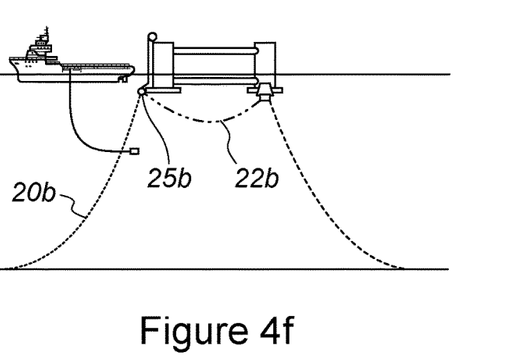

FIG. 4f shows the mooring connector 18b pulled into the semi-submersible and engaged at the mooring point 25b, ready for disconnection of the pull-in winch wire. The winch wire and winch can now be relocated to the other mooring lines to enable connection. Upon completion of the hook-up of the mooring lines, the dynamic riser(s) can be pulled-in the short distance within the structure from the top of the buoy to the final location, or connected onboard systems without any further pull-ins, thus completing hook-up of the moorings and risers.

The system and method of the invention advantageously shows that the mooring lines and risers can be pulled in instead from a shallow water depth. Hence the pull-in operation is relatively short and does not require picking up from the seabed which can be a lengthy process with attendant risks of mooring lines twist, restricted navigation and maintaining clearance from other subsea infrastructure. The winch size and length of wire needed is therefore much smaller.

The load-transfer is more gradual and controllable than picking up each mooring line from the seabed. All mooring lines are already under tension, no twist, broadly on the final azimuth and clear of the seabed, which allows the vessel performing the pull-in greater latitude in its heading for the operation. Normally it has to be stem to the pull-in location.

Following completion of the mooring hook-up the cables or risers, which are already connected to the buoy, can be hooked up internally and to the topside facilities. The cables can transfer power, communication signals and the like while the risers may transfer fluids, gases or other cables.

It will be realised that the mooring system 11 can be disconnected so that the arrangement returns to the first configuration, see FIGS. 3a to 3c, from the second configuration, see FIGS. 2a to 2c. This disconnection can be achieved by controlled release of the winches in methods known to those skilled in the art. However, in the present invention, there is the opportunity to make the mooring system 11 an emergency/ultra-quick disconnect system by remote release of the cable/riser and moorings from their connectors. Sudden release of the mooring lines and the buoy will cause them to fall to an equilibrium position in the water under gravity into the arrangement of the first configuration without any mechanical lowering arrangement.

The hook-up and disconnection operation is significantly shorter and safer with minimal vessel moves and minimal or no handling of long mooring lines to/from the seabed thus reducing risk and cost of the hook-up and disconnect of a FOWT.

Referring now to FIGS. 5a-d there is illustrated an embodiment of a disconnectable buoy showing the configuration of mooring lines and dynamic riser/power cables when disconnected from the keel of the semi-submersible.

Figure 5A:
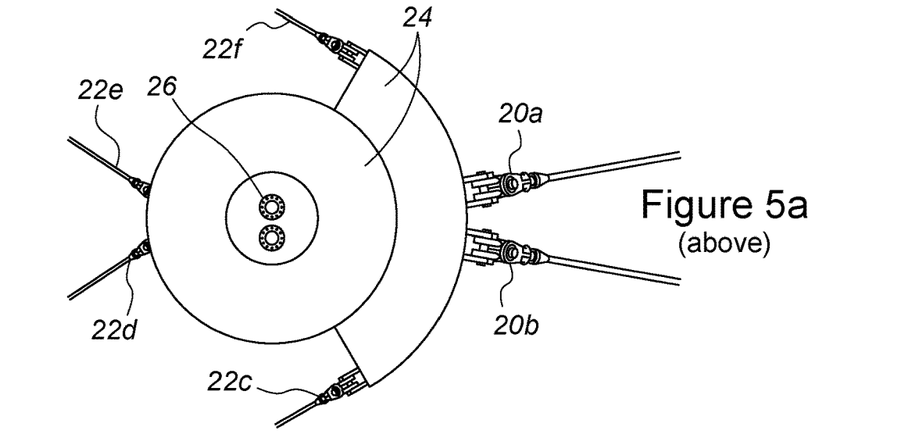
FIGS. 5a,5b,5c and 5d illustrate a buoy in the mooring system of FIGS. 2a,2b and 2c.

FIG. 5a illustrates the disconnectable buoy from above, with six mooring lines to illustrate how clearance is typically achieved between adjacent buoy chains 22c-f. The buoy 24 is circular with a shortened conical body. The buoy 24 has additional buoyancy of a greater diameter over an arc of approximately 120 degrees, to give extra buoyancy to the heavier mooring lines 20a and 20b, comprising only the mooring chains, plus give an attachment point for buoy chains 22c and 22f. The mooring chains of mooring lines 20a and 20b are connected directly to the buoy structure. The buoy chains for 22c and 22d, together with 22e and 22f, are spaced further apart to minimise the risk of clashing.

Figure 5B:
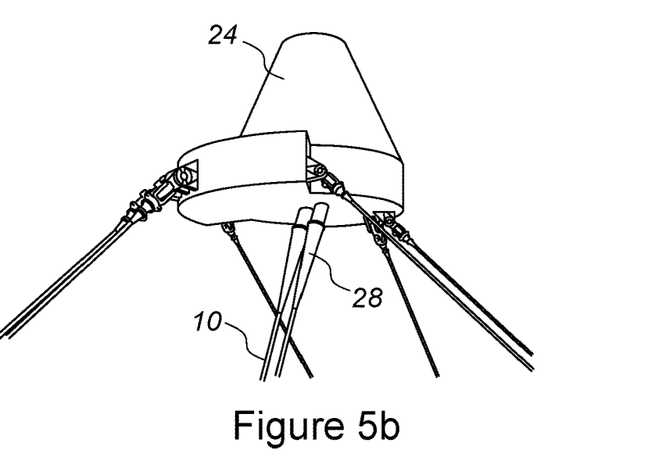
Figure 5C:
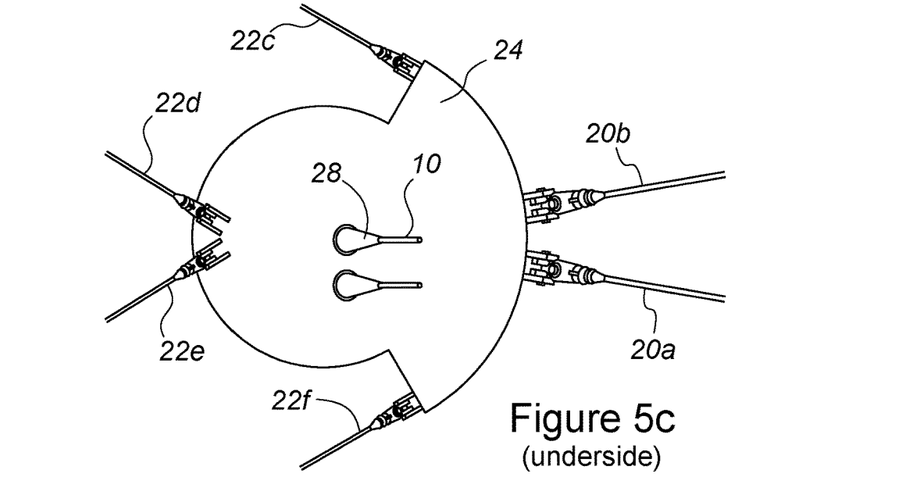

FIG. 5b show the buoy in a perspective view with the dynamic risers 10 entering the underside of the buoy 24 with a bend stiffener 28 to control the curvature, passing through the buoy 24 to the upper section where they can be hung off at the top of an I-tube 26. FIG. 5c illustrates the buoy 24, dynamic risers 10 and mooring lines 20a,b and buoy chains 22c-22f from underneath.

Figure 5D:
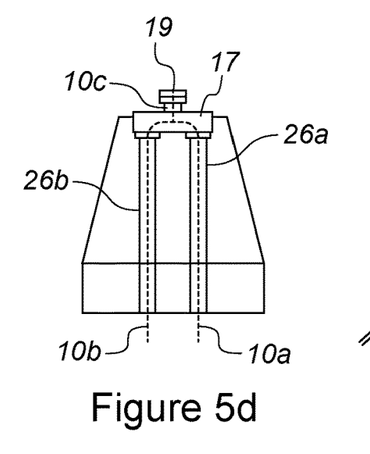

FIG. 5d shows the buoy in cross-section whereby the two risers 10a,b enter the two I-tubes 26a,b to be connected together in the manifold arrangement 17 with a single connection to a third riser 10c. The connectivity between the third riser 10c and the buoy 24 is made via a connector 19, which is normally expected to be a waterproof seal to protect the riser 10c when the buoy is lowered into the water. Thus the power or fluid cables within the risers 10a,b have connectivity and avoid breaks during deployment or disconnection. Though two risers 10a,b are shown it will be realised that a similar connectivity through a manifold 17 can be made for any number of risers and power or fluid cables.

Figure 6A:
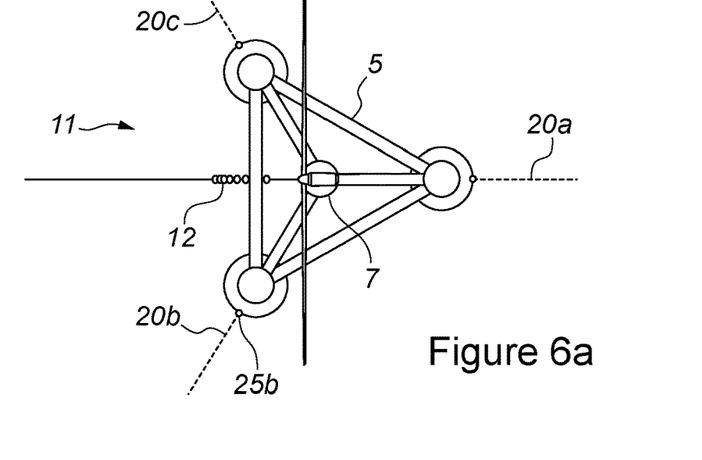
FIGS. 6a and 6b are illustrations of a mooring system for offshore semi-submersible floating structures shown in a second configuration according to a further embodiment of the present invention.
Figure 6B:
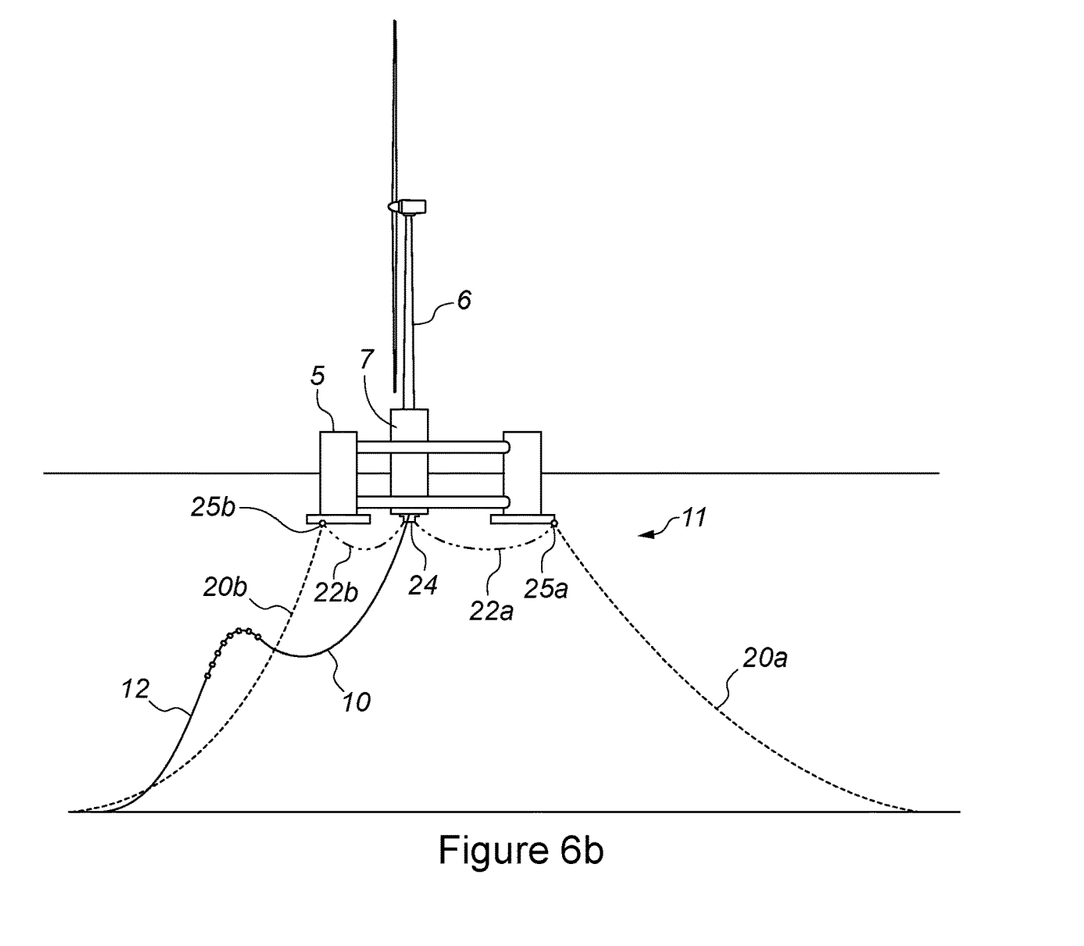

FIG. 6 illustrates an alternative embodiment with the buoy 24 connected to the underside or keel of a central column of a semi-submersible 5 and all of the mooring lines 20a-c connected to the semi-submersible 5 via the buoy 24. FIGS. 6a and 6b show a semi-submersible 5 from above and a side elevation complete with a mooring system 11. The buoy 24 is connected to a central column 7 of the semi-submersible and hence whilst immediately underneath the wind turbine 6 which facilitates connection of the power cable 10, it is not the desirable position for the mooring line connections. Therefore, the mooring lines 20a to 20c, all have buoy chains 22a-c and are pulled in to mooring points on the outlying columns as described herein before with reference to FIGS. 4a-f. The buoy chains 22a to 22c are under minimal tension when the buoy 24 is connected to the floating structure 5. In the disconnected state the buoy chains will support the mooring lines via the connectors as illustrated in FIGS. 3a-c. In this embodiment, there is no mooring tension applied to the buoy 24 from any direction.

FIGS. 7a to 7e illustrate the arrangement whereby 2 mooring lines are connected to a single buoy chain and mooring connector.

Figure 7A:
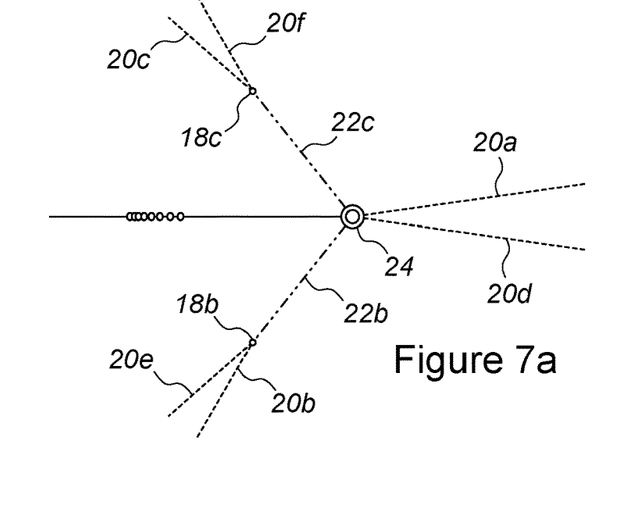
Figure 7E:
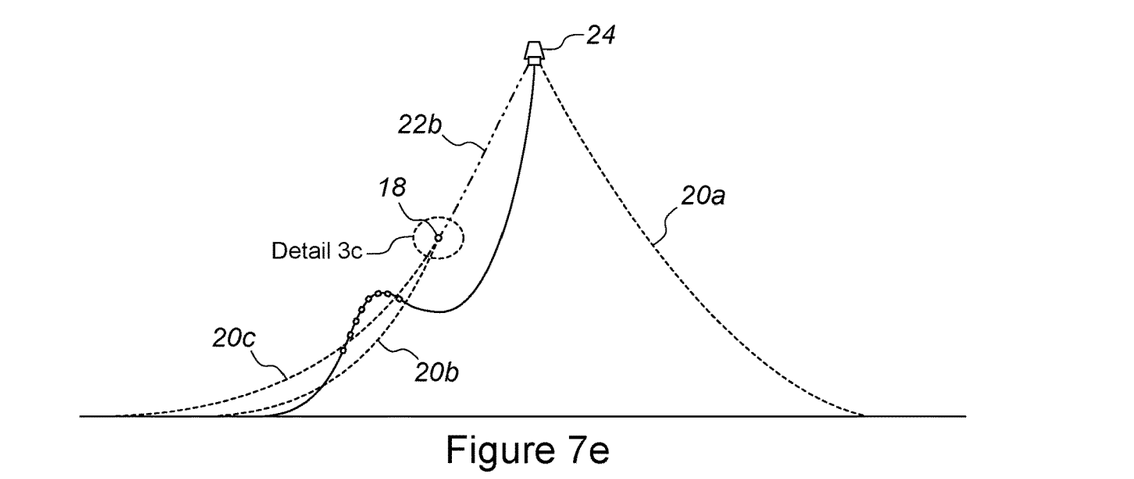

FIGS. 7a and 7e illustrates the arrangement of a mooring system in the first configuration according to a further embodiment of the present invention. In this arrangement pairs of mooring chains 20b,20e; 20c,20f are co-joined at the mooring connector 18. In this regard each pair also shares a single buoy chain 22b,22c respectively. This arrangement reduces the number of mooring connectors and buoy chains and further reduces the hook-up time for the system.

While two mooring chains are shown connected to each mooring connector, there may be three or more. There may also be different numbers of mooring chains on any of the connectors.

FIGS. 7b and 7c illustrates a typical detail of arrangement of the joining point of the mooring chains 20b,e to the mooring connector, using an alternative design of mooring connector 18b which includes a triplate 23, which allows multiple, independent planes of movement of the mooring chains. FIG. 7d illustrates the same arrangement and view as FIG. 7c, showing the mooring connector 18 being pulled to the mooring point 25 on the structure 4.

Figure 8A:
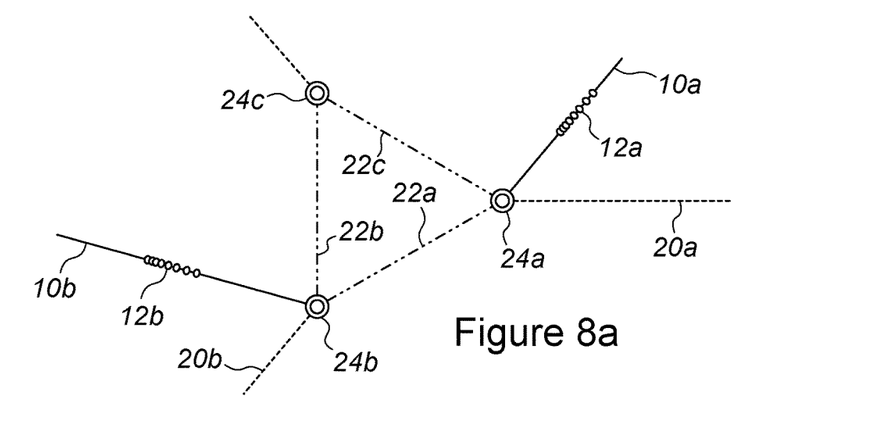
FIGS. 8a,8b and 8c illustrate still further embodiments of mooring systems according to embodiments of the present invention.
Figure 8B:
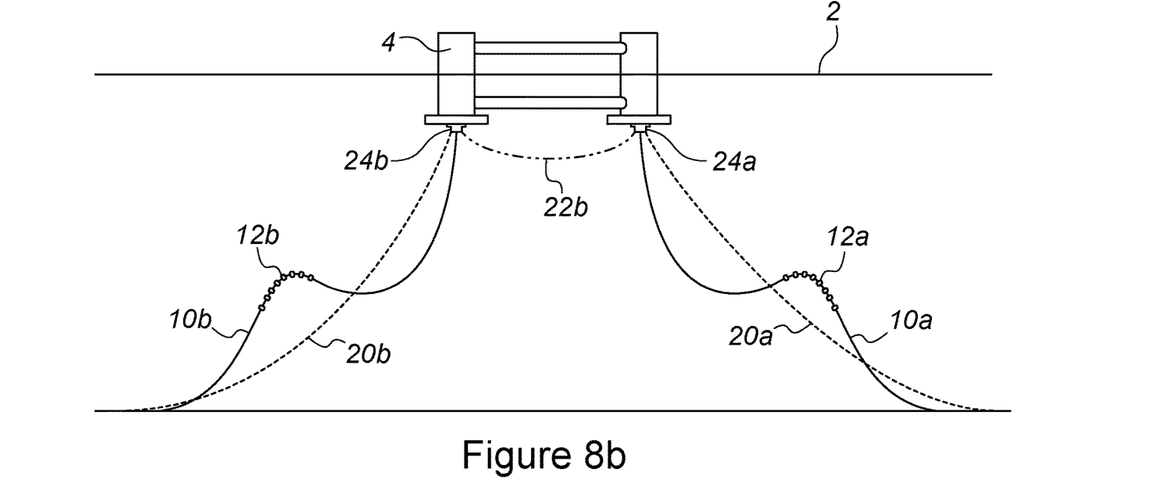
Figure 8C:
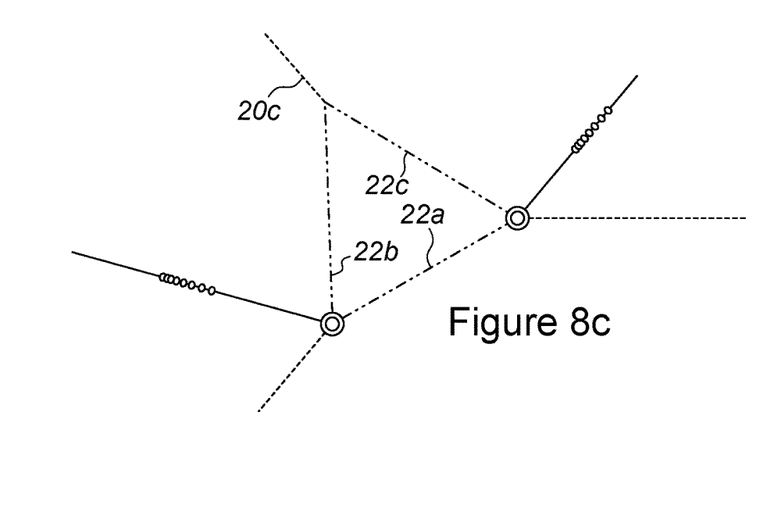

Now referring to FIGS. 8a to 8c there is illustrated two alternative embodiments of mooring systems which use multiple buoys to achieve rapid hook-up and disconnection, according to further embodiments of the present invention. These arrangements may be preferable when cables/risers need to enter different columns on a semi-submersible.

FIG. 8a shows a plan view of three disconnectable buoys 24a, 24b and 24c, connected together by three buoy chains 22a, 22b and 22c. Each buoy also has a mooring chain 20a, 20b and 20c which are connected to a seabed anchor. In this embodiment, the mooring points are on an alternative buoy. The buoy chains are slightly longer than the distance between each buoy, in order that when connected to a semi-submersible they remain slack, but when all buoys are disconnected they keep the buoys in an array under the water, resisting the horizontal component of tension in the mooring lines.

FIG. 8b illustrates the connected arrangement in elevation with the buoy chain 22b hanging slack between buoys 24a and 24b. This view is the same on the other two elevations of the semi-submersible.

FIG. 8c illustrates the use of two buoys only where the location of buoy 24c is replaced by a connection between the two buoy chains 22b and 22c and the mooring chain 20c, which may be the mooring connector as illustrated in FIG. 3. In this illustration only three mooring lines are shown, if a greater number was used such as six, the 20e and 20f mooring lines may connect directly onto the buoys 24b and 24a respectively.

These additional buoys can obviate the need to pull-in the mooring lines as they are already connected to the structure. This use of more than one buoy is particularly advantageous when the two power cables depart from different locations on the semi-submersible.

Figures 9A, 9B:
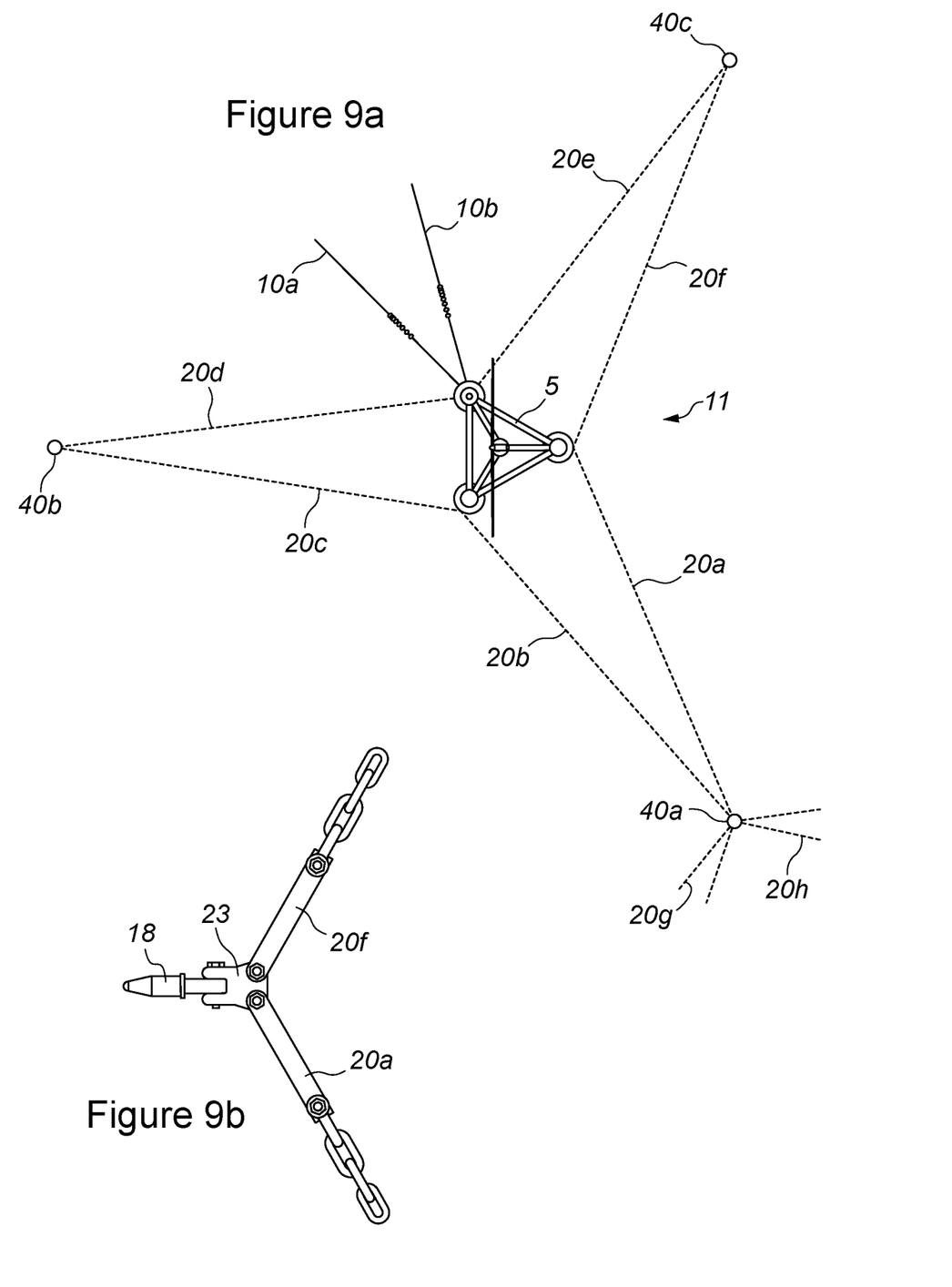
FIGS. 9a and 9b illustrate a yet further embodiment of a mooring system according to an embodiment of the present invention.

FIGS. 9a and 9b illustrate an alternative mooring layout, which allows two mooring chains 20a,b; 20c,d; 20e,f to share one anchor 40a,b,c respectively, and in the case of multiple FOWT's an arrangement which allows a further four mooring chains, as illustrated by the two pairs of moorings 20g and 20h, which connect to other FOWT's.

Mooring system 11 has a wide angle between the mooring chains 20a,b; 20c,d; 20e,f's which are attached to each column and hence the mooring connector 18 can be either connected to a single mooring chain or to two adjacent mooring chains 20a,f, as illustrates in FIG. 9b. This arrangement represents a very high efficiency in respect of minimising the installation cost of anchors but also reducing the hook-up duration and risks to a significantly lower level.

Figure 10A:
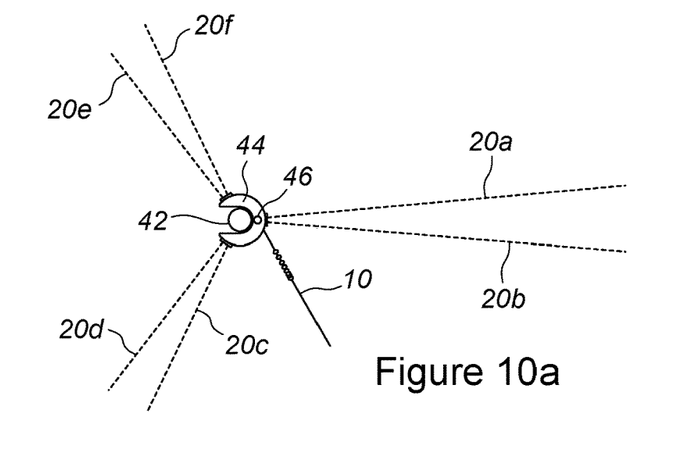
FIGS. 10a,10b and 10c illustrate a single column semi-submersible structure with a buoy connected to the side of the structure according to an embodiment of the present invention.
Figure 10B:
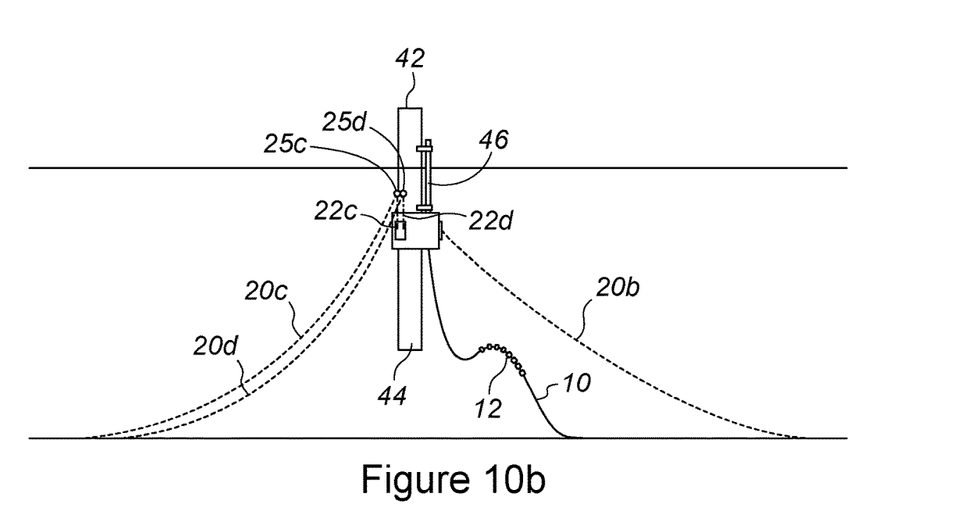
Figure 10C:
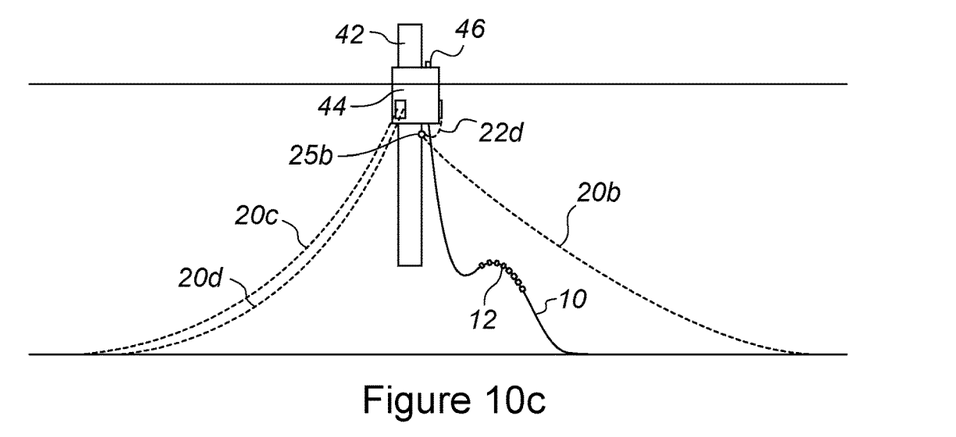

FIGS. 10a, 10b and 10c illustrate a single column floating structure 42 which may be referred to as a spar, in which the buoy 44 is alternatively connected to the side of the column. In this arrangement the buoy is 'horseshoe' shaped to allow the structure to be maneuvered into position and buoy mechanically attached to the structure. The principles of connection of the buoy to the side may be similar to that used for a semi-submersible multi-column structure. Due to the draught of the structure it is a preferred safety feature that the buoy has a section 46 piercing the water surface to identify its location and point of entry of the spar. There is no requirement to pull-in the buoy vertically as it is principally a horizontal connection between the buoy and the structure, although some ballasting capability of the buoy is prudent to allow fine adjustment of the trim and draught of the buoy.

FIG. 10b illustrates the power cable 10 is connected to the buoy 44 and rises through a vertical tube 46 to above the water surface. This avoids having to pull the power cable vertically and allows a connection in the dry above the waterline. Navigation aids, such as lights and shapes are expected to be on the top of this tube to inform other sea users of the undersea obstacle.

FIG. 10c illustrates the alternative arrangement of the buoy extending to above the waterline. This arrangement will allow a close visual observation of the buoy and structure mating process, improving the safety of the connection and disconnection operation.

The mooring lines 20a to 20f are shown connected to the buoy such that the loads on the structure are transferred through the buoy. Alternatively, the mooring lines may be pulled onto a hull connection with a mooring connector and buoy chain arrangement as illustrated in FIG. 2c or 7d. This mooring point to the hull may be above or below the buoy.

FIG. 10b illustrates the mooring connectors 25c, 25d shown attached to the structure above the buoy with the buoy chains 22c, 22d hanging vertically and slack.

FIG. 10c illustrates the mooring connector 25b shown attached to the structure below the buoy with the buoy chain 22b hanging vertically and slack. This arrangement has the structural advantage that when the environment loads the mooring line 20b there is minimal separation force between the buoy and spar and when the environment loads the mooring lines 20c, 20d there is a force pushing the spar into the buoy.

Figure 11A:
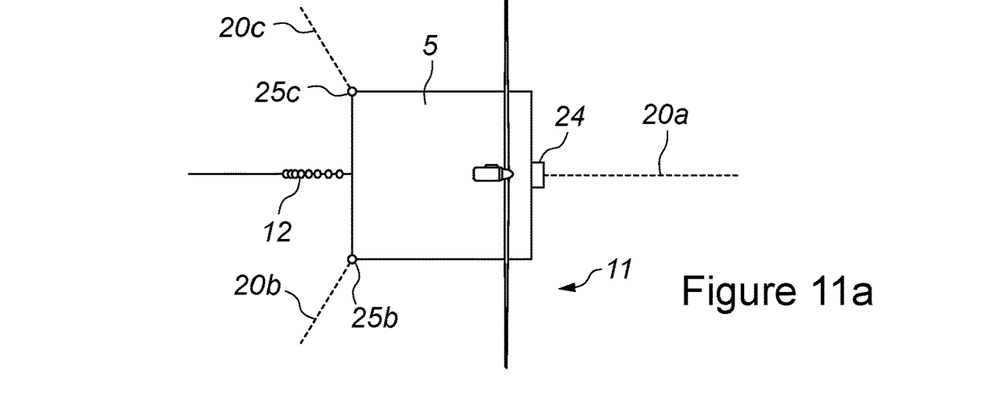
FIGS. 11a and 11b are illustrations of a mooring system for an offshore semi-submersible barge-shaped floating structure according to an embodiment of the present invention.
Figure 11B:
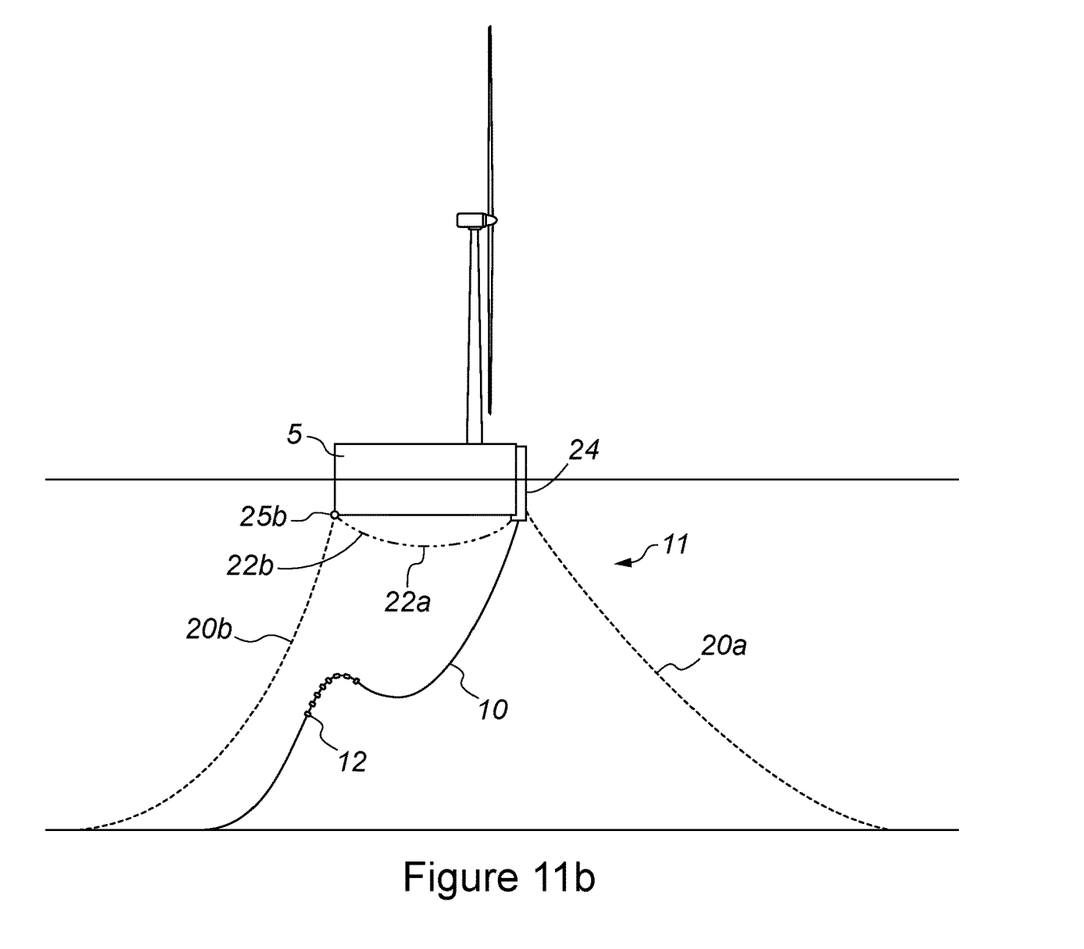

FIG. 11a to 11b illustrate an alternative embodiment with the buoy 24 connected to the side of a barge 5 with the mooring line 20a connected directly to the buoy. The mooring lines 20b,20c are connected to the structure using the connectors 25a, 25b and hence connected to the buoy using buoy chains 22a, 22b respectively. The riser 10 can be connected at the surface deck level in this configuration; however, an underside connection can equally be made as illustrated in FIG. 2.

The principle advantage of the present invention is that it provides a disconnectable mooring system for offshore semi-submersible structures which combines the convenience of a 'turret' style buoy with a desired fixed heading spread mooring configuration.

A further advantage of the present invention is that the buoy, which can support the power cable, does not have any swivel or rotating bearings, and takes either no environmental loads or loads from only one side. Further the arrangement can be designed that there is no direct handling of the subsea cable, if the internal comportment into which the buoy is pulled into can be made water-tight or is above the outside water level plus electrical or fluid continuity can be provided between each riser or cable.

A still further advantage of the present invention is that by having a mooring line suspended off a subsea buoy which can be pulled into location in a semi-submersible structure, via a connector in the upper part of the mooring line which by pulling upwards into a mating connector, rotates the connector circa 90 deg clockwise to present at the desired angle. Therefore, the pull-in operation does not need the support tug to thrust hard to help the pull-in, instead it is done gradually and much more controlled.

A yet further advantage of the present invention is that the layout of the mooring system lends itself to a rapid disconnection by remote control release of the mooring lines and buoy(s), reducing the requirement for personnel onboard but yet leaving the moorings, buoy(s) and riser ready for prompt re-connection.

The invention claimed is:

1. A disconnectable mooring system for offshore semi-submersible floating structures, comprising:
   a buoy including means to connect and disconnect from the structure;
   a plurality of mooring lines;
   each mooring line comprising a mooring chain, the mooring chain having a first end connected to an anchor on a seabed;
   at least one mooring line also comprising a buoy chain, a first end of the buoy chain being connected to a second end of the mooring chain via a mooring connector and a second end of the buoy chain being connected to the buoy;
   wherein, in use: in a first configuration, the buoy is disconnected from the structure and the buoy chain supports the mooring chain, preventing the mooring connector contacting the seabed; and in a second configuration, the buoy is connected to the structure and the mooring chain is pulled in via the mooring connector to a mooring point on the structure to tension the mooring chain, thereby providing a spread to the structure with the buoy chain being a catenary.

2. A disconnectable mooring system according to claim 1 wherein in the second configuration, mooring tension on the buoy is applied in no more than one direction.

3. A disconnectable mooring system according to claim 1 wherein in at least one mooring line, the second end of the mooring chain is connected directly to the buoy, and the at least one mooring line is located on one side of the buoy so that the(se) mooring line(s) provide mooring tension to the buoy from one side.

4. A disconnectable mooring system according to claim 1 wherein all of the mooring lines include a buoy chain.

5. A disconnectable mooring system according to claim 1 wherein the mooring connector is a three-way connector, providing a first connection to the mooring chain, a second connection to the buoy chain and a third connection for joining to the mooring point on the structure.

6. A disconnectable mooring system according to claim 5 wherein the third connection provides a mating connector for connection to a winch or other like pulling in arrangement.

7. A disconnectable mooring system according to claim 5 wherein each connection provides a pivot so the mating connector will take up the position dependent on the tension applied at each connection.

8. A disconnectable mooring system according to claim 1 wherein the at least one mooring line also comprising a buoy chain further comprises a second mooring chain, the second mooring chain having a first end connected to another anchor on the seabed and a second end connected to the mooring connector.

9. A disconnectable mooring system according to claim 1 wherein more than one mooring chain is connected to an individual anchor on the seabed.

10. A disconnectable mooring system according to claim 1 wherein the buoy is fully submerged in both the first and the second configurations.

11. A disconnectable mooring system according to claim 10 wherein the buoy is connected to an underside of the structure.

12. A disconnectable mooring system according to claim 1 wherein the buoy is partially submerged in both the first and the second configurations.

13. A disconnectable mooring system according to claim 12 wherein the buoy is clamped onto a side of the structure.

14. A disconnectable mooring system according to claim 1 wherein the buoy chains are more lightweight than the mooring chains.

15. A disconnectable mooring system according to claim 1 wherein the buoy also includes connection for power cables or any flexible riser for transporting fluids or gases.

16. A disconnectable mooring system according to claim 15 wherein a manifold arrangement is provided as part of the buoy to allow electrical or fluid connectivity between two or more risers when disconnected from the structure.

17. A disconnectable mooring system according to claim 1 wherein the semi-submersible floating structure is a multi-column floating semi-submersible structure.

18. A disconnectable mooring system according to claim 1 wherein the semi-submersible floating structure supports a wind turbine.

19. A disconnectable mooring system according to claim 1 wherein the semi-submersible floating structure is a single column floating semi-submersible structure.

20. A method of mooring an offshore semi-submersible floating structure, comprising the steps:
   (a) providing a disconnectable mooring system comprising:
      a buoy including means to connect and disconnect from the structure;
      a plurality of mooring lines;
      each mooring line comprising a mooring chain, the mooring chain having a first end connected to an anchor on a seabed;
      at least one mooring line also comprising a buoy chain, a first end of the buoy chain being connected to a second end of the mooring chain via a mooring connector and a second end of the buoy chain being connected to the buoy;
   (b) arranging the disconnectable mooring system in a first configuration, wherein the buoy is disconnected from the structure and the buoy chain supports the mooring chain, preventing the mooring connector contacting the seabed;
   (c) connecting the buoy to the structure;
   (d) pulling in the mooring connector to a mooring point on the structure to tension the mooring chain on each of the mooring lines which also comprise a buoy chain; and
   (e) thereby arranging the disconnectable mooring system in a second configuration, spreading the mooring lines around the structure with the buoy chain being a catenary.

* * * * *